No. 733,500. PATENTED JULY 14, 1903.
S. W. MOORE.
COMPOUND BEVEL JOINT.
APPLICATION FILED NOV. 17, 1902.

NO MODEL.

Witnesses:
Thomas J. Sherman
John D. Ferree

Inventor:
Stephen W. Moore

No. 733,500. Patented July 14, 1903.

UNITED STATES PATENT OFFICE.

STEPHEN W. MOORE, OF MARION, INDIANA.

COMPOUND BEVEL-JOINT.

SPECIFICATION forming part of Letters Patent No. 733,500, dated July 14, 1903.

Application filed November 17, 1902. Serial No. 131,790. (No model.)

*To all whom it may concern:*

Be it known that I, STEPHEN W. MOORE, a citizen of the United States, residing at the city of Marion, in the county of Grant and State of Indiana, have invented a new and useful Compound Bevel-Joint, of which the following is a specification.

My invention relates to improvements in joints for frame structures of whatever size or character, whether constructed of wood, metal, or other material; and the objects of my invention and improvement are to provide a substantial and durable joint for structural work, provide means of preserving the integrity of such joint, and to afford facilities for disconnecting the same. I attain these objects by the mechanism and method illustrated in the accompanying drawings, in which—

Figure 1:
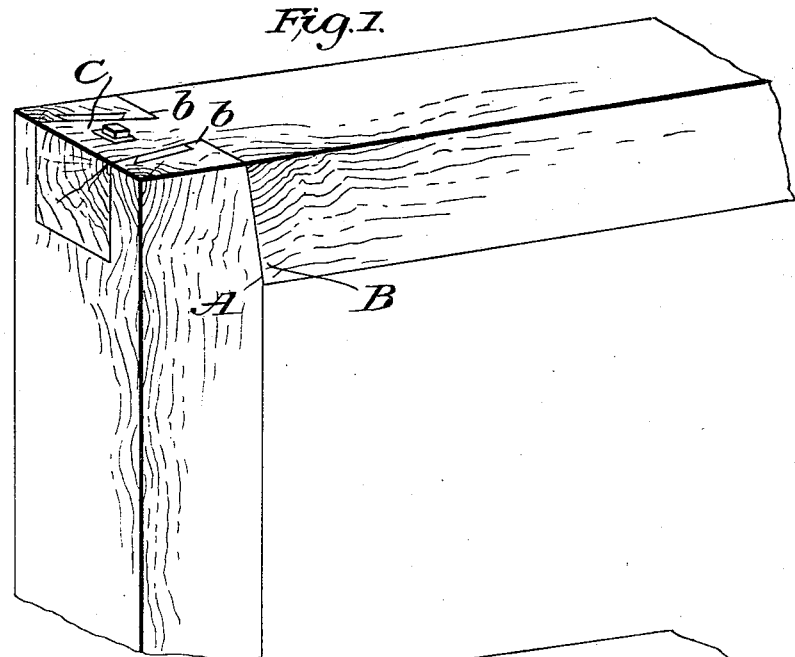
Figure 2:
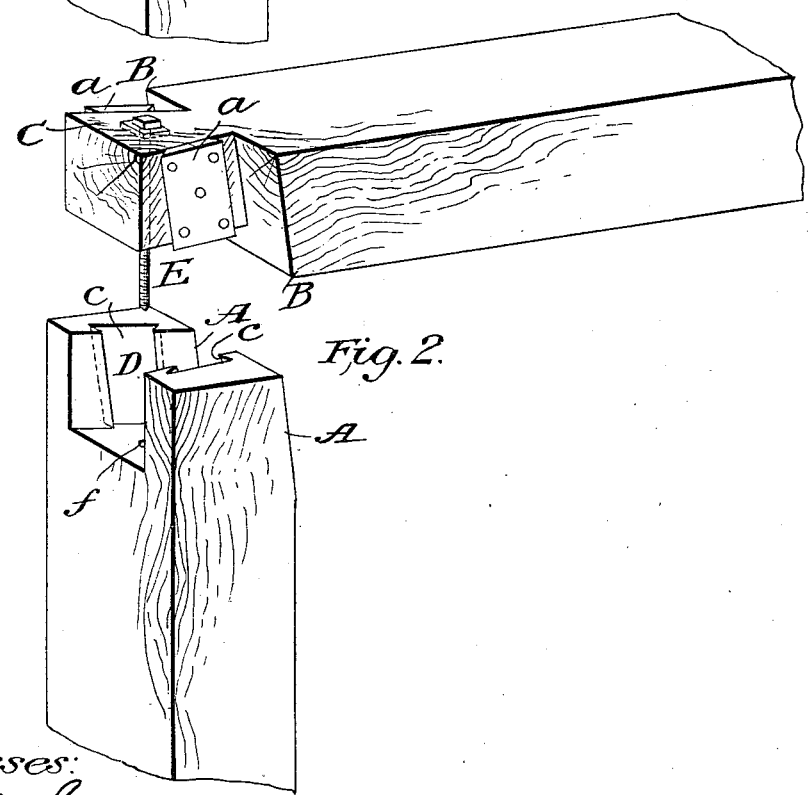

Figure 1 is a view of the joint when closed, and Fig. 2 is a detailed view of the related parts of the joint disconnected.

Similar letters refer to similar parts throughout both views.

In the drawings, the projection C from the framework and integral therewith is a trapezoidal tenon largest at the tip. Of the parallel surfaces of this tenon the one next to the inner angle of the parts united by the joint is, for purposes of description, designated as the "lower" and the other as the "upper" surface or part of the tenon. The sides $b\ b$ of the tenon slant inward from the tip of the tenon to the lateral shoulders B B, thus forming the wedge-shaped tenon C, which is largest at the tip. The shoulders B B are beveled from the lower to the upper surface of the tenon at any desired incline from the perpendicular toward the tip of the tenon and at an angle adapted to fit and match the corresponding bevels A A on the sides of the jaws of the slot or mortise D.

On the respective slanting sides of the tenon C are the transverse tongues $a\ a$, of any suitable width and adapted to match and fit into corresponding grooves $c\ c$ in the jaws of the slot or mortise D. The threaded bolt or screw E passes through the tenon C and into the structural material of the joint and framework at $f$ and is adapted to firmly secure the tenon C in place within the mortise or slot. The sides of the transverse tongues $a\ a$ are beveled inward toward the axis of the tongues, rendering the same narrower at the base, forming a short wedge-shaped tenon adapted to dovetail into and fit the corresponding grooves $c\ c$ in the mortise D, said tongues or transverse tenons forming, with said grooves, a beveled joint. Said transverse tongues may be cast or formed on the slanting side of the tenon C and integral therewith or may be formed independently thereof and firmly fixed to the slanting sides thereof by any suitable means.

To unite the parts of the compound bevel-joint herein described, the tenon C is introduced into the slot D, the tongues $a\ a$ enter the grooves $c\ c$, and the tenon is pressed or driven down into the slot until the related parts of the joint are all brought closely and held firmly together. The screw or threaded bolt is then inserted, and the parts thereby screwed and held firmly together, so as to prevent the tenon from slipping upward from the bottom of the slot or mortise D.

The advantages of the herein-described joint over other structural joints, and especially over a simple dovetail, are obvious. The threaded bolt E, passing through the tenon C and being screwed into the structural material of the joint at the bottom of the slot D, together with the tongues $a\ a$ and the grooves $c\ c$, combine and assist in maintaining the integrity of the joint and obviate the necessity of gluing or fastening the parts of the joint together in the ordinary way. By removing the threaded bolt or screw E the parts of the joint may, in the absence of glue or other ordinary fastenings, be readily disconnected without injuring or marring the joint. The transverse tongues $a\ a$ in place within the grooves $c\ c$ hold together the jaws of the slot D and prevent them from spreading and the piece of which they are a part from splitting or cracking. Should the fit of the joint become impaired by shrinkage, it is obvious that the parts of the joint may, owing to the peculiar construction of the joint, be brought again to a close fit.

I am aware that prior to my invention a simple dovetail was used in framing; but in this joint it has been converted from a simple to a compound form and is associated with other integrants absolutely new.

What I claim as my invention, and desire to secure by Letters Patent, is—

1. A framing-joint comprising two members, one of said members having on its end, and integral therewith, a dovetail tenon, with dovetail tongues across each slanting side of said tenon, the other member having in its end a slot and grooves on each side of said slot, and opening into it, said slot and grooves being formed and arranged to correspond to said tenon and tongues, and said tenon and tongues formed and arranged to slide into and fit said grooves and slot, as shown and described.

2. A framing-joint comprising two members, one of said members having on its end, and integral therewith, a dovetail tenon widest at its tip, with dovetail tongues narrowest at their base, across each slanting side of said tenon, the other member having in its end a slot, and jaws on each side of said slot, grooves in said jaws opening into said slot, beveled shoulders extending laterally from the base of said tenon, bevels on the edges of said jaws formed to correspond to the bevels on said shoulders, said tenon and tongues being formed and arranged to slide into and fit said slot and grooves, and said bevels on said jaws and shoulders being formed and adapted to be placed in juxtaposition and fit and engage each other, as shown and described.

3. A framing-joint having its stile formed with a slot in the end of the stile, and jaws on each side of the slot with their corresponding edges beveled upward and inward, beveled grooves on the inside of each of said jaws and opening into said slot, a rail having on its end a wedge-shaped tenon widest at its tip, shoulders on said rail extending laterally from the base of said tenon and beveled upward at an incline toward the tip of said tenon to correspond to and fit the bevels on said jaws, said tenon having beveled tongues across each of its slanting sides, said tongues and said tenon being arranged and formed to dovetail and fit into said grooves and slot, and said bevels being formed and adapted to engage and fit each other when the parts of the joint are united, as shown and described.

4. The combination in a framing-joint of structural parts consisting of one part having on its end a wedge-shaped tenon largest at its tip, beveled shoulders extending laterally from the base of said tenon, beveled tongues across its slanting sides, another part having in its end a slot formed to correspond to said tenon, and jaws on each side of said slot with grooves formed and arranged on the inside of each of said jaws to correspond to said beveled tongues; said tenon, tongues, slot and grooves arranged and adapted to form a dovetail, and said bevels on said jaws and shoulders, respectively, to fit and mutually engage when the related parts of the joint are united, and the threaded bolt adapted to pass through said tenon and screw into the structural part beneath said tenon, as shown and described, and for the purposes specified.

In testimony whereof I have signed my name to this specification in the presence of two subscribing witnesses.

STEPHEN W. MOORE.

Witnesses:
THOMAS J. SHERMAN,
JOHN D. FERREE.